June 15, 1926.

R. W. COUSINS 1,589,054

STARTING APPARATUS FOR D. C. MOTORS

Filed Nov. 25, 1921     3 Sheets-Sheet 2

Patented June 15, 1926.

1,589,054

UNITED STATES PATENT OFFICE.

ROBERT W. COUSINS, OF GARY, INDIANA.

STARTING APPARATUS FOR D. C. MOTORS.

Application filed November 25, 1921. Serial No. 517,544.

My invention relates to starting mechanism involving a plurality of resistance units, or sections, to be automatically cut out of the motor circuit, in succession, to supply to the motor, when all of the resistance units, or sections, are cut out, the desired amount of current for operating the motor, with the desired acceleration.

As apparatus of the general character above referred to has hitherto been provided, it is necessary to adjust for different loads imposed on the motor, the various switch devices employed for successively cutting out the resistance units, or sections, to cause the switches to operate for the purpose stated, when the current traverses the motor circuit in the accelerated movement of the motor, it being intended by such apparatus that successive resistance units, or sections, be cut out as the motor in accelerating causes the current in the motor to become decreased to a predetermined degree. While such apparatus performs satisfactorily when the motor starts and the load thereon at any stage in the acceleration of the motor is a predetermined one, with the result that the current decreases to such predetermined degree; it does not operate automatically to successively cut out the resistance units, or sections, when the motor does not start, or where the load on the motor after starting exceeds such predetermined amount, and the current in the motor circuit thus does not decrease to such predetermined amount, and thus the mechanism for automatically cutting out the resistance units fails to function automatically to cut out the resistance units, or sections, in succession, requiring that the operator either readjust the resistance cut-out switches to the particular condition presented or operate them by hand.

My primary object is to provide an apparatus of the general character above stated which shall function automatically, to cut out, in succession, to effect the desired quick starting of the motor, all of the resistance units, or sections, in the motor circuit, regardless of the failure of the motor to start and regardless of the loads imposed on the motor during any of its periods of acceleration. A further object is to provide such a mechanism which will be comparatively simple and economical of construction, positive in operation, and which shall not become impaired by continued use; and other objects as will be manifest from the following description.

Referring to the accompanying drawings:—

The particular starting apparatus illustrated in the drawings involves, as elements thereof, a relay, detailed in Figs. 2 to 7 inclusive, and a transformer detailed in Figs. 8, 9 and 10, these elements being combined, and electrically connected with, other elements of the starting apparatus and the motor to be started, as hereinafter described.

Figures 2, 3, 4, 5, 6, 7:
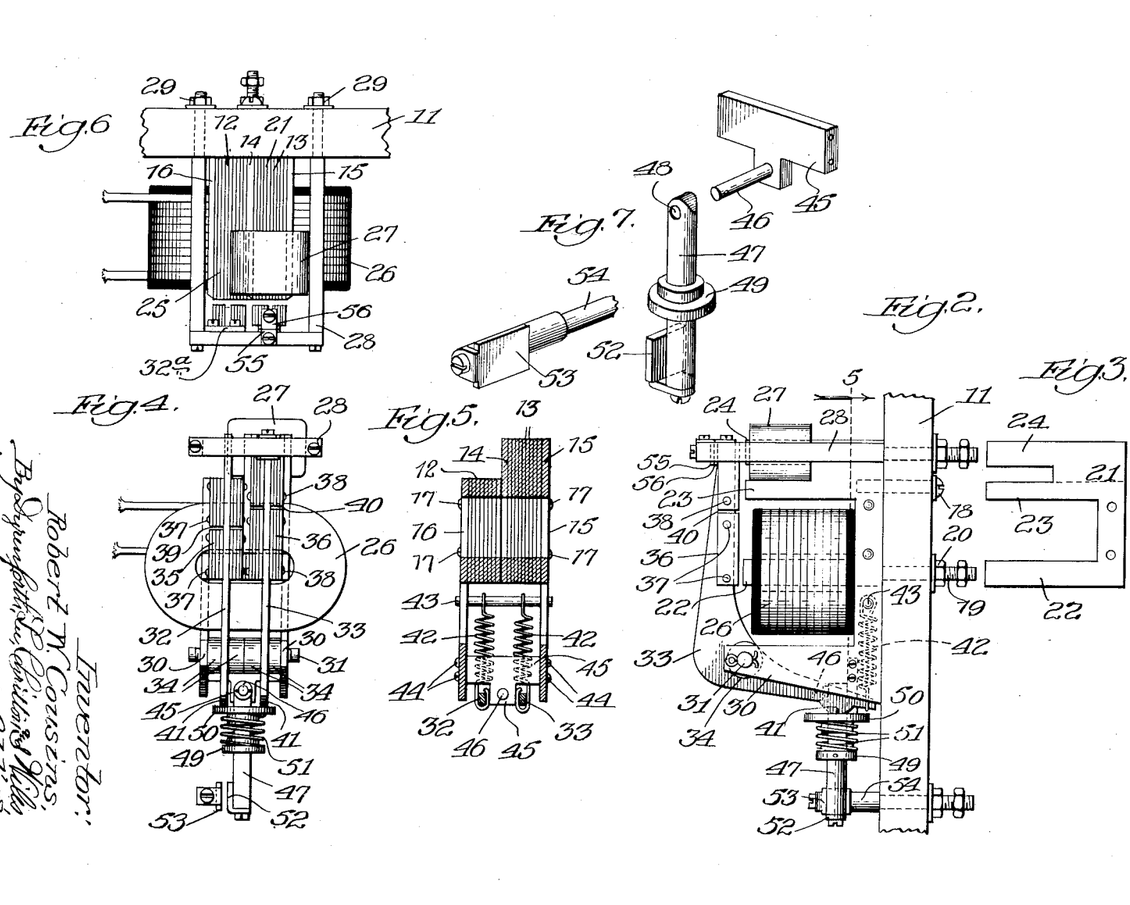
Fig. 2 is a broken view in side elevation of a relay forming a portion of the equipment of Fig. 1.
Fig. 3 is a face view of one of the several similar laminations forming a part of the core of the relay.
Fig. 4 is a front view of the construction shown in Fig. 2.
Fig. 5 is a section taken at the line 5 on Fig. 2 and viewed in the direction of the arrow.
Fig. 6 is a plan view of the relay.
Fig. 7 is a perspective view of the members forming the lower portion of the relay and involving contact elements, these various parts being shown in disassembled, but related, condition.

Referring first to the construction of the relay, the supporting plate, or board, thereof, is represented at 11 and supports the operating parts of the relay. The core of the relay is formed of two groups, or sections, 12 and 13, of laminations in the form of sheets, of soft iron, these two groups of laminations being divided by a plate 14 and flanked at opposite sides thereof by plates 15 and 16, these various laminations and plates being rigidly secured together as by means of the rivets represented at 17. The core-structure thus provided is secured against the face of the board 11, as by means of the screw 18 which passes through this board and screws into the core-structure referred to, and by means of the threaded stud 19 projecting rearwardly from said core-structure through an opening in the board 11 and clamped in position by the nut 20. The laminations of the section 13 thereof, these laminations being represented at 21, are preferably of the form shown in Fig. 3, which may be produced by milling out the sheets to provide the three legs 22, 23 and 24; the laminations of the section 12, represented at 25, being of the same shape and form as the laminations 21, except that the portions thereof above the plane of the upper surface of the leg 23 is omitted, the plates 14 and 15 being of the same form as the laminations 21 and the plate 16 of the same form as the laminations 25. The leg thus provided by the portions 22 of the laminations 21 and 25 and the similar portions of the plates 21, supports a coil 26 of insulated wire, and the leg formed by the portions 24 of the laminations 21 and the similar portions of the plates 14 and 15 supports a shading coil 27 consisting of a solid spool of copper, containing an opening therethrough at which it surrounds the leg portion last referred to. The relay also comprises a yoke-frame 28 rigidly connected at its ends with the board 11, as through the medium of the nuts 29, this yoke partially surrounding the upper end of the laminated core-structure referred to. The plates 15 and 16 extend below the coil 26 and provide the forwardly projecting spaced-apart arms 30 in which a cross-shaft 31 is secured, this shaft having journalled thereon armatures comprising, respectively, lever arms 32 and 33, these arms being spaced apart and spaced from the plates 30 by spacers 34 surrounding the shaft 31. The arms 32 and 33 at their upper ends are of laminated construction, the laminations on the arm 32 being represented at 35, and those on the arm 33, at 36, the laminations of these respective arms being located at opposite sides of the arms and rigidly secured thereto, as through the medium of the rivets 37 and 38. The laminations 35 oppose the outer ends of the pole-pieces formed by the legs 22 and 23, these laminations being formed in sections to provide the gap 39; and the laminations 36 oppose the pole-pieces formed by the leg portions 22, 23 and 24, these laminations being formed in sections to provide the gap 40. The arms 32 and 33 are of bell-crank form and engage the shaft 31 at their angles, the lower surfaces of their rearwardly-extending ends being rounded as represented at 41. The armature-structures thus provided, for cooperating with the poles afforded by the leg portions 22, 23 and 24, as stated, are normally held in spaced relation to these poles, as shown in Figs. 2 and 6, by means of coil springs 42 one for each of the armatures, these springs being connected at their lower ends with the rear ends of the arms 32 and 33, respectively, and at their upper ends with a cross-pin 43 secured in the plates 15 and 16. Positioned between the plates 15 and 16 to extend crosswise thereof and secured thereto, as by screws 44, is a plate 45 of T-shape, from the lower end of which a pin 46 forwardly extends, this pin forming a pivotal support for a depending rod 47 journalled on the pin 46 at an opening 48 in the rod. The rod 47 is provided with a stepped-disk 49 rigidly secured thereto below the pivot-pin 46, and with a second stepped-disk 50 surrounding the rod 47 above the disk 49 and freely movable up and down on the rod 47, except as restrained by a coil spring 51 surrounding the rod 47 and the reduced portions of the disks 49 and 50, and bearing at its ends against the enlarged portions of these disks, this spring operating to yieldingly force the disk 50 against the curved portions 41 of the arms 32 and 33. The lower end of the rod 47 is provided with a contact 52, which opposes, and cooperates with, a contact 53 carried on the outer end of a rod 54 rigidly secured in, and projecting forwardly from, the board 11, the rear end of this rod forming a binding post. The frame 28 is provided with a rearwardly-extending contact-member 55 with which a contact 56 on the armature 33 cooperates, the contact 56 engaging with the contact 55 in the normal condition of the apparatus, and the armature 32 bearing against a block 32$^a$ of insulating material on the yoke 28, in this condition of the apparatus.

Figure 8:
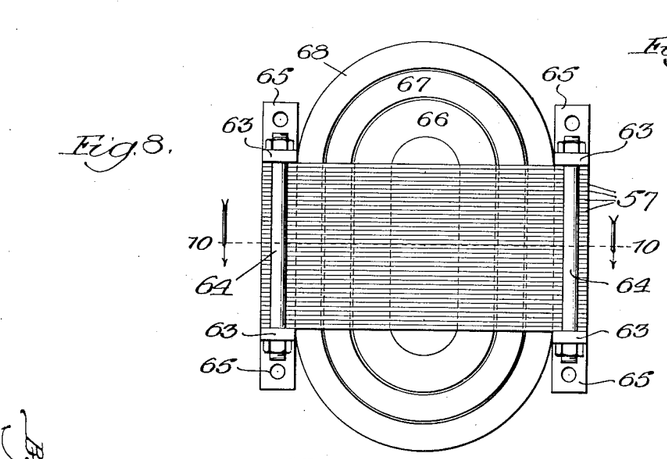
Fig. 8 is a view in front elevation of a transformer comprising one of the parts of the apparatus shown in Fig. 1.
Figure 9:
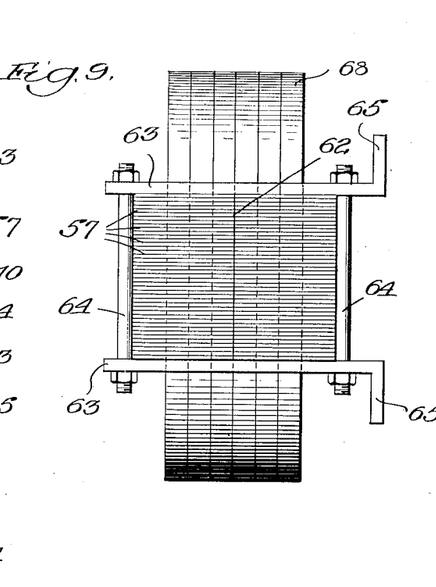
Fig. 9 is a view in side elevation of the transformer.
Figure 10:
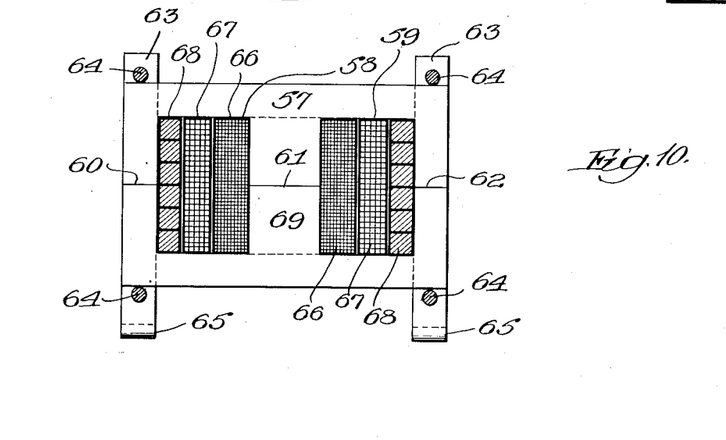
Fig. 10, a section taken at the line 10—10 on Fig. 8 and viewed in the direction of the arrows.

The transformer construction shown in Figs. 8, 9 and 10 comprises a core portion of laminated construction, the laminations thereof being represented at 57, and each comprising a plate of magnetic material, and so formed as to provide the openings 58 and 59 extending therethrough, each lamination being formed of two similar sections spaced apart throughout the length of these laminations to provide air-gaps, represented at 60, 61 and 62. The laminations 57 are held together in flatwise-opposed position, as shown, by means of bars 63, four of these bars being shown between which the body of laminations is confined at its ends by means of bolts 64 extending through these bars, the latter at the rear side of the structure thus provided, having angularly-extending portions 65 at which the transformer is adapted to be secured in position on any suitable support. The transformer also comprises three nested coils 66, 67 and 68, which are located within the openings 58 and 59 and surround the central web-portion 69 of the laminated core-structure. The coil 68 constitutes the primary winding of the transformer, the coil 67 the secondary winding thereof and the coil 66 a shunt winding, the coils 66 and 68 being wound differentially.

Figure 1:
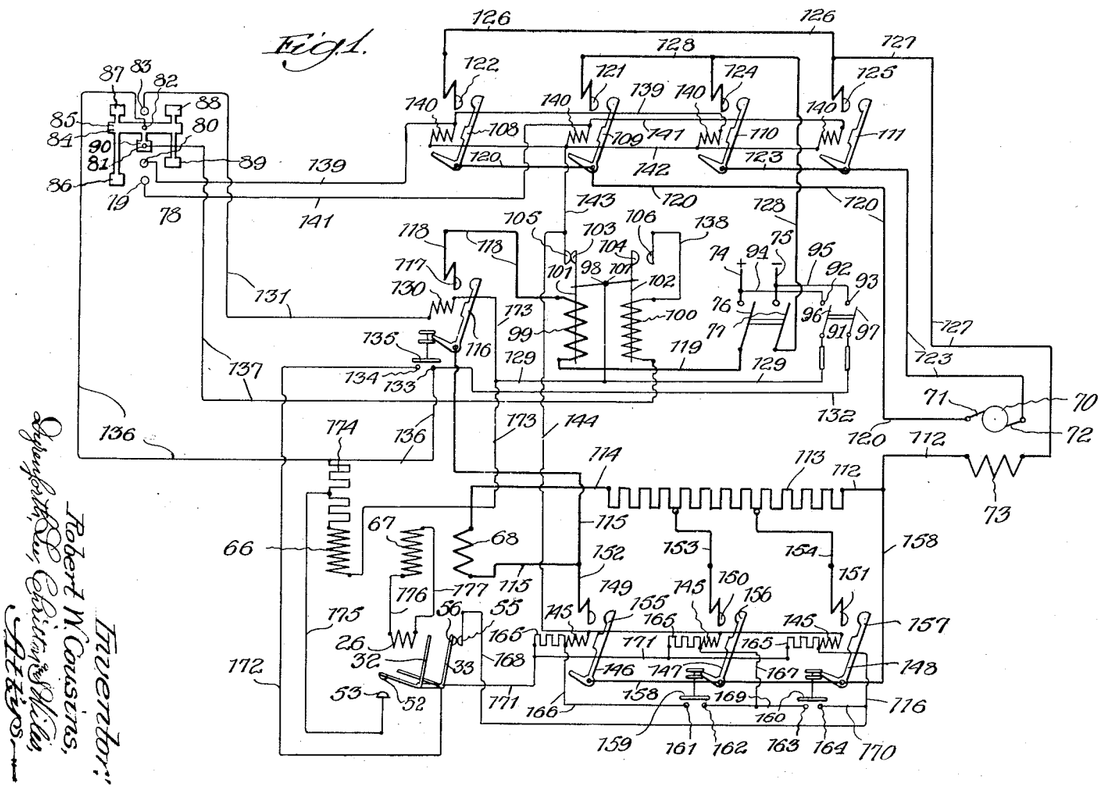
Figure 1 is a view in the nature of a diagram illustrating my invention, this figure showing the various circuit arrangements of the starting mechanism.

Referring now to the particular illustrated construction of starting apparatus, together with the various circuit connections between it and the motor, the operation of which is to be controlled, as shown in Fig. 1, the commutator of the motor is represented at 70, its brushes at 71 and 72, and its field-winding at 73. The main-line wires are represented at 74 and 75, these wires connecting with the stationary contacts of a main-line switch, the movable contacts of which are represented at 76 and 77. At 78 is represented a master-switch of a type commonly employed, the stationary contacts of which are represented at 79, 80, 81, 82 and 83 and with which cooperate the rotatable contact-equipped member 84 affording the contact plate 85 and the contact sections 86, 87, 88, 89 and 90, the contact strip 84 co-operating with the stationary finger 82, the contact portions 87 and 88 with the stationary contact 83, the contact portion 90 with the stationary contact 81, the contact portion 86 with the contact 79, and the contact portion 89 with the stationary contact 80. The auxiliary switch for controlling the current through the master-switch 78 is represented generally at 91, its stationary contacts being represented at 92 and 93 and connected, respectively, with the wires 74 and 75, by wires 94 and 95, and its movable contacts being represented at 96 and 97. The arrangement shown also comprises an over-load-protection device represented generally at 98, this being of common form, and comprising the solenoid coils 99 and 100, the cores 101 and 102 of which control contacts 103 and 104, respectively, which cooperate with stationary contacts 105 and 106, respectively, with trip-mechanism, represented generally at 107, cooperating with these cores, whereby when one of the cores is drawn into its coil the contact carried thereby will engage with the one of the stationary contacts with which it cooperates and the contact on the other core will be disengaged from the one of the stationary contacts with which it cooperates. The arrangement shown also comprises automatic reversing switches represented at 108, 109, 110 and 111, which may be of common and well known construction and which operate, in conjunction with the master switch 78, to cause the motor to be driven in either direction, under the control of the operator.

The circuit connections containing the various parts just described, are as follows: One end of the field winding 73 connects, by a wire 112, with one end of the resistance 113 through which the current supplied to the motor passes and the cutting out of successive portions, or units, of which, to speed up the motor, is provided for as hereinafter described. The other end of the resistance 113 is connected by a wire 114 with one end of the primary winding 68 of the transformer hereinbefore described, the other end of this primary winding being connected, by a wire 115, with a movable contact arm 116 of a line-circuit breaker, such as is commonly employed in motor starting apparatus, the contact portion of the arm 116 cooperating with a yielding contact 117 connected, by a wire 118, with one end of the coil 99, the other end of this coil being connected, by a wire 119, with the contact arm 76 of the main switch. The brush 71 is connected, by a wire 120, with the movable contact arms of the reversing switches 108 and 109, these arms cooperating with yieldable contacts 121 and 122. The other brush 72 of the motor is connected, by a wire 123, with the movable contact arms of the reversing switches 110 and 111, these arms cooperating with yieldable contact members 124 and 125, respectively, of the switches. The contacts 122 and 125 are connected together, by a wire 126, which latter is connected, by a wire 127, with the end of the field winding 73 opposite that connected with the wire 112. The stationary contacts 121 and 124 are connected with the movable contact 77 of the main-line switch by means of a wire 128. The movable contact 96 of the auxiliary switch 91 is connected, by a wire 129, with one end of the coil 130 which actuates the switch arm 116, the other end of this coil being connected with the stationary contact 83 by a wire 131. The arm 97 of the switch 91 connects, by a wire 132, with the contact 133 of a pair thereof (133 and 134) adapted to be bridged by a contact device 135 operated by the lever 116 when the coil 130 is energized, a wire 136 connecting the contact 133 with the stationary contact 82. The stationary contact 81 is connected, by a wire 137, with one end of the coil 100, the opposite end of this coil being connected, by a wire 138, with the contact 106. The contact 80 of the master switch connects, by a wire 139, with one end of each of the coils 140 of the reversing switches 108 and 110. The stationary contact 79 connects, by a wire 141, with one end of each of the actuating coils 140 of the reversing switches 109 and 111. The other ends of the four coils 140 are connected together by a wire 142 which is connected, by a wire 143, to the contact 105. The wire 143 connects, by a wire 144, with one end of each of the coils 145 of a plurality of resistance contactors, represented at 146, 147 and 148, the yieldable contacts of which are represented at 149, 150 and 151, the contact 149 being connected with the wire 115 by means of a wire 152, the contact 150 connected with the resistance 113 between the ends of the latter, by a wire 153, and the contact 151 connected to this resistance at another point, by a wire 154. The movable contact arms 155, 156 and 157 of the contactors 146, 147 and 148, respectively, are connected together and to the wire 112 by a wire 158. The arms 156 and 157 cooperate with bridging contact members 159 and 160, respectively, which, in turn, cooperate with contacts 161 and 162 and 163 and 164, respectively. The ends of the coils 145 of these various resistance contactors, opposite the ends thereof connected with the wire 144, are connected with resistances 165 and with wires 166, 167 and 168, respectively, the wire 166 being connected with the contact 161, the wire 167 with the wire 169 connecting together the contacts 162 and 163, and the wire 168 with the contact 55, a wire 170 connecting the contact 164 with the wire 168. The ends of the resistances 165 opposite those connected with the respective coils 145, are connected together by a wire 171, which is electrically connected with the arm 33 of the relay, this arm being also connected with the contact 134, by a wire 172. The end of the coil 130 opposite that at which it is connected with the wire 131, is connected, by a wire 173, with one end of the shunt coil 66, the other end of this coil being connected to one end of a resistance 174 of fixed resistance, the other end of this resistance being connected with the wire 136. A wire 175 connects the contact 53 with the resistance 174 at a point intermediate the ends of the latter. The ends of the coil 26 of the relay are connected with the ends of the secondary 67 of the transformer by wires 176 and 177.

The operation of the apparatus described is as follows. Assuming the parts of the apparatus to be in the position shown in the drawings, namely in "off" position; to start the motor the operator closes the main-line switch and the auxiliary switch 91, and rotates the contact-equipped member 84 of the master switch in one direction or the other, depending on the direction the motor is to be rotated. Assuming that the member 84 is moved to the right in Fig. 1, the contacts 86 and 87 will be brought into engagement with the contacts 79 and 83, respectively, and the contact 90 moved out of engagement with the contact 81. Thus operating the master switch causes a small amount of current to traverse the following circuit—wires 74 and 94, contact 92, switch arm 96, wires 129 and 173, coil 130, wire 131, contact 83 of master switch, member 84, wires 136 and 132, contact arm 97 of auxiliary switch, contact 93, and wire 95 to main-line wire 75. A circuit is also established through the coils 140 of the reversing switches 109 and 111, this circuit being as follows—from main-line wire 75 to contact 82, through member 84, contact 79, wire 141, coils 140 referred to, wires 142 and 143, through contacts 105 and 103 to wire 129, thence through switch arm 96 to main-line wire 74. Thus energizing the coil 130 and the coil 140 of the reversing switches 109 and 111 closes the line-circuit breaker and the two switches 109 and 111, thereby closing the motor-circuit for driving the motor in one direction, the circuit thus established being as follows—main-line wire 74, switch arm 76, wire 119, coil 99, wire 118, contact 70, switch arm 116, wire 115, transformer primary 68, wire 114, resistance 113, wire 112, field winding 73, wire 127, contact 125, switch arm of the switch 111, wire 123, motor brush 72, thence to brush 71 through wire 120, switch arm of the switch 109, wire 128, switch arm 77 of main-line switch, and thence to line-wire 75. It will be understood from the foregoing that if it is desired that the motor rotate in the opposite direction to that just described, the operator instead of shifting the contact-equipped member 84 to the right in Fig. 1 would shift it to the left, in accordance with common practice, thereby closing the switches 108 and 110 instead of the switches 109 and 111, which would cause the current to traverse the circuit in which the brushes 71 and 72 are interposed, in the opposite direction.

The closing of the auxiliary switch 91 operates to cause current to traverse the shunt coil 66 of the resistance 174 in series therewith, the circuit being as follows—from main line 74 through arm 96 of the auxiliary switch, wire 129, wire 173, to shunt coil 66, thence through resistance element 174, to wire 136, wire 132, arm 97 and thence to line wire 75. Thus in the arrangement illustrated as soon as the auxiliary switch 91 is closed, current is caused to traverse the shunt coil 66 and the resistance 174, the current maintained through the shunt coil 66 being maintained constant so long as the auxiliary switch 91 is closed, except during those periods, as hereinafter stated, when a portion of the resistance 174 is cut out, as hereinafter described.

Closing of the line-circuit breaker operates to bridge the contacts 133 and 134 but not until after the contact arm 116 engages the contact 117, for a purpose hereinafter described.

The closing of the motor circuit, as hereinbefore described, energizes the primary 68 of the transformer, and current therefore immediately begins to traverse this coil. As the current rises in the circuit in which the coil 68 is interposed a magnetic flux, in opposition to the flux produced by the coil 66, due to the differential winding of coils 66 and 68, is produced in the core of the transformer and so long as the current through this coil contines to rise, current is induced in the coil 67 and consequently current flows through the relay coil 26. Thus enegrizing the relay coil 26 causes both of the arms 32 and 33 to rock in clockwise direction in Fig. 2, against the spring resistance referred to, the arm 33 disengaging from the contact 55. In this operation both of the arms 32 and 33 exert uniform downward pressure on the disk 50 on opposite sides of the rod 47, so that the normal position of this rod is not disturbed. The contacts 133 and 134 having become bridged by the contact 135 after the coil 26 has become energized and the arms operated as stated, the following circuit becomes established—from line wire 74. through wire 94 and contact 92, auxiliary-switch arm 96, wire 129, contacts 103 and 105, wire 144, coils 145 and resistances 165 to wire 171, through wire 172, contacts 134, 135 and 133 to wire 132, thence to auxiliary-switch arm 97, contact 93, wire 95, to switch arm 75. The resistances 165 are such that the current traversing the coils 145 and these resistance in series, is insufficient to move the switch arms 155, 156 and 157 into engagement with the respective contacts 149, 150 and 151.

The moment the flow of current through the primary 68 reaches its maximum and thus no longer increases, current ceases to be induced in the secondary 67 of the transformer, whereupon the relay coil 26 becomes de-energized, and the arm 32 swings back to normal position. As the flux produced by the current in shading coil 27 is out of time phase with that produced by the current in coil 26, this shading coil operates to cause the arm 33 to remain in the position to which it was operated by the energizing of the coil 26, so long as the current traverses the shading coil. The moment the arm 32 returns to normal position, as stated, the rod 47 by action of the spring 51 swings to the left in Fig. 4 and the contacts 52 and 53 engage with the result of short circuiting a portion of the resistance coil 174, the circuit thus established being as follows—from main-line wire 74 to wire 94, contact 92, auxiliary-switch arm 96, wire 129, wire 173, coil 66, resistance 174, wire 175, contacts 53 and 52, wire 172, contacts 134, 135 and 133, wire 132, switch-arm 97, contact 93 and wire 95 to wire 75. A portion of the resistance 174 is thus cut out before the shading coil has become de-energized and while the arm 33 is out of normal position. Upon cutting out a portion of the resistance 174, as stated, the current through the shunt coil 66 increases and, assuming that the motor has started by the closing of the motor circuit as stated, the amount of the current traversing the transformer primary 68, becomes decreased due to the counter electromotive force generated by the actuation of the motor. The cutting out of a portion of the resistance 174, as stated, results in a current being induced in the transformer secondary 67 and consequently current flows through the relay coil 26, current continuing to be induced in the secondary 67 until the current traversing the motor-circuit becomes decreased to such an extent that the saturation point is reached in the transformer and thus no flux therein is produced, or until the current in the motor circuit becomes constant before such saturation point is reached. Upon cessation of flow of current through the transformer secondary 67, the coil 26 becomes de-energized and the arm 32 rocks to normal position, and as soon as the shading coil 27 becomes de-energized the arm 33 rocks to normal position, whereupon the contacts 52 and 53 disengage and the contacts 55 and 56 engage, with the result of cutting out the resistance coil 165 cooperating with the resistance contactor 148, whereupon the coil 145 of this contactor becomes energized sufficiently to close the circuit between the contacts 151 and 157, the current, instead of passing from the switch arm 33 through the wire 171 and the various resistances 165 and coils 145 to the wire 144, passing from the arm 33 through the contacts 56 and 55, wire 168, coil 145, wire 144, to wire 129. Thus closing the contactor 148 cuts out a portion of the resistance 113, namely one-third thereof in the particular illustrated diagrammatic showing, which operates to cause an increase of current to the motor. In this connection it may be stated that, as explained of the line-circuit breaker, the contactors are so constructed, in accordance with common practice, that the contacts 150 and 151 are yieldable and are engaged by the respective arms 156 and 157 cooperating therewith, before the respective contact-plates 159 and 160 are moved into engagement with the stationary contacts 161 and 162 and 163 and 164.

Thus cutting out a part of the resistance 113 serves to increase the current through the transformer primary 68, with the result hereinbefore explained, in connection with the initial starting of the motor, the cycle of operations described being repeated with the result of effecting the cutting out of the resistance 165 of the resistance contactor 147, whereupon another section of the resistance coil 113 is cut out, it being understood that by the closing of the resistance-contactor 148, the contacts 163 and 164 are bridged by the contact 160, but not until after the arm 157 engages contact 151 and the arm 33 has become disengaged from the contact 55 and by the closing of the contactor 147 the contacts 161 and 162 are bridged by the contact 159, but not until after the arm 156 has engaged the contact 150. The closing of the contactor 147 operates to actuate the relay as explained in connection with the initial supplying of current to the motor, for closing the contactor 146 and short circuiting the resistance 113 and the transformer primary 68.

In the particular arrangement illustrated, the shunt coil of the transformer would consist of such a number of turns of wire relative to the turns of the primary that the transformer will become saturated and flux thereupon cease to flow in the transformer, when the current traversing the motor circuit, upon the starting of the motor, drops to any selected predetermined value, so that as soon as the motor accelerates to such an extent that the current therethrough drops to such predetermined value, the transformer becomes saturated and current ceases to be induced in the tansformer secondary, whether or not the current in the motor circuit has become a constant, and as a result a portion of the resistance 113 is cut out as hereinbefore explained. Should, however, the current in the motor circuit not decrease, due to the load on the motor, to the selected predetermined value at which the transformer becomes saturated, the apparatus will nevertheless automatically operate to cut out a part of the resistance 113, as the moment the current in the motor circuit reaches a constant, the transformer secondary becomes de-energized.

Should the motor, by reason of the inertia of its load, fail to start, a current will be induced in the transformer secondary 67 and flow through the coil 26 operating the arms 32 and 33, as hereinbefore stated, and as soon as the current through the shunt coil 66 and a portion of the resistance 174 in circuit therewith, when the contact 52 is in engagement with the contact 53, reaches its maximum, the arms 32 and 33 will, in succession, return to normal position, thereby causing the resistance-contactor 148 to close and supply more current to the motor, it being understood that such operation of the apparatus will occur regardless of the motor refusing to start when current is initially supplied thereto or at any stage in the cutting out of the sections of the resistance 113.

It will be noted that by providing for the cutting out of a portion of the resistance 174, the necessary time element is provided in which the motor may speed up under the action of the current supplied thereto, this feature of the apparatus permitting of the accelerating of the motor to a point where its speed becomes constant, regardless of the rate at which it accelerates, due to variations in the load on the motor. The shading coil 27, operating as stated, serves to maintain the contacts 55 and 56 in engagement when the current supplied to the motor reaches a maximum and at which time it is a constant and thus, by reason of the fact that at this time there would be no change in flux in the transformer, no current will be induced in the transformer secondary 67.

The air gap between the sections of the transformer core as explained is provided of such width as compared with the length of the iron forming the transformer core, that the flux will more nearly follow the ampere turns than in the case of a closed magnetic circuit transformer, and thus approach the condition presented by the air-core transformer.

While I have illustrated and described a particular construction embodying my invention, I do not wish to be understood as intending to limit it thereto as the same may be variously modified and altered without departing from the spirit of my invention.

What I claim as new and desire to secure by Letters Patent, is:

1. The combination with an electric circuit and a motor and a resistance section interposed therein, of a switch controlling the cutting out of said resistance section, a relay controlling the actuation of said switch, a transformer comprising a primary winding and a secondary winding and having a shunt winding, said primary being energized by current traversing said circuit, resistance in series with said shunt-winding, and means for causing current to flow through said shunt winding and said resistance in series therewith, said relay being provided with a shading coil and being controlled by said secondary and said shading coil and operating, when current ceases to be induced in said secondary by the current in said circuit reaching the maximum, to cut out resistance in series with said shunt winding during the energization of said shading coil.

2. The combination with an electric circuit and a motor and a resistance section interposed therein, and a switch controlling the cutting out of said resistance section, of a plural-armature relay controlling the actuation of said switch, a transformer comprising a primary winding and a secondary winding and having a shunt winding, said primary being energized by current traversing said circuit, resistance in series with said shunt winding, and means for causing current to flow through said shunt winding and said resistance in series therewith, said relay being provided with a shading coil cooperating with one of the armatures of said relay, both of said armatures cooperating with said secondary, said secondary operating, when energized, to operate both of said armatures, and said shading coil operating, during the period current ceases to flow in said secondary by the current in said circuit reaching the maximum, to retain the armature with which it cooperates in the position to which it was operated by said secondary, said relay operating, when current ceases to be induced in said secondary and during the energization of said shading coil, to cut out resistance in series with said shunt winding, and the one of said armatures which cooperates with said shading coil moving, when current ceases to be induced in said secondary following the cutting out of resistance in series with said shunt winding, to a position in which said switch cuts out resistance in said circuit.

3. The combination with an electric circuit and a motor and a resistance section interposed therein, and a switch controlling the cutting out of said resistance section, of a plural-armature relay controlling the actuation of said switch, a transformer comprising a primary winding and a secondary winding and having a shunt winding, said primary being energized by current traversing said circuit, resistance in series with said shunt winding, and means for causing current to flow through said shunt winding and said resistance in series therewith, a second circuit, switch-operating means in said second circuit for operating said switch, resistance in series with said last-named means, and a third circuit in which said last-named means are interposed to the exclusion of said last-referred-to resistance, said relay being provided with a shading coil cooperating with one of the armatures of said relay, both of said armatures cooperating with said secondary, said secondary operating, when energized, to operate both of said armatures and said shading coil operating during the period current ceases to flow in said secondary by the current in said first-named circuit reaching the maximum, to retain the armature with which it cooperates in the position to which it was operated by said secondary, said relay operating, when current ceases to be induced in said secondary and during the energization of said shading coil, to cut out resistance in series with said shunt winding, and the one of said armatures which cooperates with said shading coil operating, when current ceases to be induced in said secondary following the cutting out of resistance in series with said shunt winding, to condition said third circuit for the flow of current therethrough for energizing said switch-operating means to actuate said switch and cut out resistance in said motor circuit.

4. The combination with an electric circuit and a motor and a resistance section interposed therein, of a switch controlling the cutting out of said resistance section, a relay controlling the actuation of said switch, a transformer comprising a primary winding and a secondary winding and having a shunt winding, said primary being energized by current traversing said circuit, resistance in series with said shunt winding, and means for causing current to flow through said shunt winding and said resistance in series therewith, said relay being provided with a shading coil and being controlled by said secondary and said shading coil and operating, when current ceases to be induced in said secondary by the current in said circuit reaching the maximum, to cut out resistance in series with said shunt winding during the energization of said shading coil, said shunt winding being such that decrease of the value of the current to a predetermined degree flowing through said circuit due to the starting of the motor, will cause the transformer to become saturated and cease to induce current in said secondary.

5. The combination with an electric circuit and a motor and a resistance section interposed therein, and a switch controlling the cutting out of said resistance section, of a plural-armature relay controlling the actuation of said switch, a transformer comprising a primary winding and a secondary winding and having a shunt winding, said primary being energized by current traversing said circuit, resistance in series with said shunt winding, and means for causing current to flow thorugh said shunt winding and said resistance in series therewith, said relay being provided with a shading coil cooperating with one of the armatures of said relay, both of said armatures cooperating with said secondary, said secondary operating, when energized, to operate both of said armatures and said shading coil operating, during the period current ceases to flow in said secondary by the current in said circuit reaching the maximum, to retain the armature with which it cooperates in the position to which it was operated by said secondary, said relay operating when current ceases to be induced in said secondary and during the energization of said shading coil, to cut out resistance in series with said shunt winding, and the one of said armatures which cooperates with said shading coil moving, when current ceases to be induced in said secondary following the cutting out of resistance in series with said shunt winding, to a position in which said switch cuts out said resistance section in said circuit, said shunt winding being such that decrease of the value of the current to a predetermined degree flowing through said first-named circuit due to the starting of the motor, will cause the transformer to become saturated and cease to induce current in said secondary.

6. The combination with an electric circuit and a motor and a resistance section interposed therein, and a switch controlling the cutting out of said resistance section, of a plural-armature relay controlling the actuation of said switch, a transformer comprising a primary winding and a secondary winding and having a shunt winding, said primary being energized by current traversing said circuit, resistance in series with said shunt winding, and means for causing current to flow through said shunt winding and said resistance in series therewith, a second circuit, switch-operating means in said second circuit for operating said switch, resistance in series with said last-named means, and a third circuit in which said last-named means are interposed to the exclusion of said last-referred-to resistance, said relay being provided with a shading coil cooperating with one of the armatures of said relay, both of said armatures cooperating with said secondary, said secondary operating, when energized, to operate both of said armatures, and said shading coil operating during the period current ceases to flow in said secondary by the current in said first-named circuit reaching the maximum, to retain the armature, with which it cooperates, in the position to which it was operated by said secondary, said relay operating when current ceases to be induced in said secondary and during the energization of said shading coil, to cut out said resistance section in series with said shunt winding, and the one of said armatures which cooperates with said shading coil operating, when current ceases to be induced in said secondary following the cutting out of resistance in series with said shunt winding, to condition said third circuit for the flow of current therethrough for energizing said switch-operating means to actuate said switch and cut out resistance in said motor circuit, said shunt winding being such that decrease of the value of the current to a predetermined degree flowing through said first-named circuit due to the starting of the motor, will cause the transformer to become saturated and cease to induce current in said secondary.

7. The combination of an electric circuit and a motor and a resistance section interposed therein, a switch controlling the cutting out of said resistance section, a second circuit, switch operating means in said second circuit, resistance in said second circuit in series with said means, a third circuit in which said means are interposed to the exclusion of said last-referred-to resistance, a plural-armature relay, a transformer comprising a primary winding and a secondary winding and having a shunt winding, said primary being energized by current traversing said first-named circuit, resistance in series with said shunt winding, means for causing current to flow through said shunt winding and said resistance in series therewith, said relay being provided with a shading coil cooperating with one of the armatures of said relay, both of said armatures cooperating with said secondary, circuit-controlling means for said third circuit controlled by the armature cooperating with said shading coil and closing said third circuit at this point in the normal condition of said relay, circuit controlling means for both second and third circuits operating automatically, following the closing of said motor circuit to close said second and third circuits at this point, said secondary operating, when energized, to operate both of said armatures out of normal position, said shading coil operating, during the period current ceases to flow in said secondary by the current in said first-named circuit reaching the maximum, to retain the armature with which it cooperates out of normal position, a fourth circuit in which said shunt winding and at the most a portion only of the resistance in series therewith, are interposed, a circuit-controlling means operated by said relay when said secondary becomes deenergized and while said shading coil remains energized, for closing said fourth circuit at this point, the one of said armatures cooperating with said shading coil moving, when current ceases to be induced in said secondary following the cutting out of resistance in said fourth circuit, to normal position in which said third circuit is closed and said resistance section in said motor circuit is cut out.

8. The combination of an electric circuit and a motor and a resistance section interposed therein, a switch controlling the cutting out of said resistance section, a second circuit, switch operating means in said second circuit, resistance in said second circuit in series with said means, a third circuit in which said means are interposed to the exclusion of said last-referred-to resistance, a plural-armature relay, a transformer comprising a primary winding and a secondary winding and having a shunt winding, said primary being energized by current traversing said first-named circuit, resistance in series with said shunt winding, means for causing current to flow through said shunt winding and said resistance in series therewith, said relay being provided with a shading coil cooperating with one of the armatures of said relay, both of said armatures cooperating with said secondary, circuit-controlling means for said third circuit controlled by the armature cooperating with said shading coil and closing said third circuit at this point in the normal condition of said relay, circuit controlling means for both second and third circuits operating automatically, following the closing of said motor circuit to close said second and third circuits at this point, said secondary operating, when energized, to operate both of said armatures out of normal position, said shading coil operating, during the period current ceases to flow in said secondary by the current in said first-named circuit reaching the maximum, to retain the armature with which it cooperates out of normal position, a fourth circuit in which said shunt winding and at the most a portion only of the resistance in series therewith, are interposed, a circuit-controlling means operated by said relay when said secondary becomes deenergized and while said shading coil remains energized, for closing said fourth circuit at this point, the one of said armatures cooperating with said shading coil moving, when current ceases to be induced in said secondary following the cutting out of resistance in said fourth circuit, to normal position in which said third circuit is closed and said resistance section in said motor circuit is cut out, said shunt winding being such that decrease of the value of the current to a predetermined degree flowing through said first-named circuit due to the starting of the motor, will cause the transformer to become saturated and cease to induce current in said secondary.

9. The combination with an electric circuit and a motor and resistance interposed therein, of means, operating automatically, and controlled by current induced by the flow of current through said circuit, to start the motor, said means including a core and windings, said core having an air-gap.

10. The combination with an electric circuit and a motor and a resistance section interposed therein, of a switch controlling the cutting out of said resistance section, a relay controlling the actuation of said switch, and current-induction means energized by current flowing in said circuit for controlling said relay, said means including a core and windings, said core having an air-gap.

11. The combination with an electric circuit and a motor and a resistance section interposed therein, of a switch controlling the cutting out of said resistance section, a device controlling the actuation of said switch, a transformer comprising a primary winding and a secondary winding and having a shunt winding, the core of said transformer having an air-gap, said primary being energized by current traversing said circuit, resistance in series with said shunt winding, and means for causing current to flow through said shunt winding and said resistance in series therewith, said relay being provided with a shading coil and being controlled by said secondary and said shading coil and operating, when current ceases to be induced in said secondary by the current in said circuit reaching the maximum, to cut out resistance in series with said shunt winding during the energization of said shading coil.

ROBERT W. COUSINS.